United States Patent
Li et al.

(10) Patent No.: US 12,085,760 B2
(45) Date of Patent: Sep. 10, 2024

(54) POWER EQUALIZER AND ADJUSTMENT METHOD THEREFOR

(71) Applicant: HUAWEI TECHNOLOGIES CO., LTD., Guangdong (CN)

(72) Inventors: Shimao Li, Dongguan (CN); Yunfei Yan, Dongguan (CN); Bing Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 274 days.

(21) Appl. No.: 17/575,534

(22) Filed: Jan. 13, 2022

(65) Prior Publication Data

US 2022/0137300 A1    May 5, 2022

Related U.S. Application Data

(63) Continuation of application No. PCT/CN2020/110897, filed on Aug. 24, 2020.

(30) Foreign Application Priority Data

Oct. 14, 2019   (CN) .......................... 201910974368.0

(51) Int. Cl.
    *G02B 6/293*    (2006.01)
    *G02B 6/27*     (2006.01)
    (Continued)

(52) U.S. Cl.
    CPC ......... *G02B 6/29391* (2013.01); *G02B 6/272* (2013.01); *G02B 6/2773* (2013.01);
    (Continued)

(58) Field of Classification Search
    CPC .. G02B 6/29391; G02B 6/272; G02B 6/2773; G02B 6/2938; G02B 26/0808; H04B 10/2941; H04B 10/564
    (Continued)

(56) References Cited

U.S. PATENT DOCUMENTS

| | | | |
|---|---|---|---|
| 7,133,202 B1* | 11/2006 | Gu ..................... | H04B 10/2941 385/11 |
| 11,316,591 B2* | 4/2022 | Jia ....................... | H04B 10/572 |

(Continued)

FOREIGN PATENT DOCUMENTS

| | | |
|---|---|---|
| CN | 102226848 A | 10/2011 |
| CN | 102707387 A | 10/2012 |

(Continued)

OTHER PUBLICATIONS

Nakajima et al; SDM—Compatible Dynamic Gain Equalizer Using Spatial and Planar Optical Circuit; 2017; OSA; pp. 1-3. (Year: 2017).*

(Continued)

*Primary Examiner* — Amritbir K Sandhu
(74) *Attorney, Agent, or Firm* — Fish & Richardson P.C.

(57) ABSTRACT

One example power equalizer includes an input/output assembly, a multiplexer/demultiplexer, a pre-attenuation component, and a light beam modulator. The multiplexer/demultiplexer demultiplexes a first light beam into a plurality of first sub-wavelength light beams including a particular sub-wavelength light beam, and propagates the plurality of first sub-wavelength light beams to the pre-attenuation component. The pre-attenuation component makes the particular sub-wavelength light beam incident onto the light beam modulator at a preset angle. The light beam modulator performs angular deflection on the plurality of first sub-wavelength light beams to obtain a plurality of second sub-wavelength light beams. The pre-attenuation component then propagates the plurality of second sub-wavelength light beams to the multiplexer/demultiplexer. The multiplexer/demultiplexer multiplexes the plurality of second sub-wavelength light beams into a second light beam.

15 Claims, 9 Drawing Sheets

(51) Int. Cl.
*G02B 26/08* (2006.01)
*H04B 10/294* (2013.01)
*H04B 10/564* (2013.01)

(52) U.S. Cl.
CPC ....... *G02B 6/2938* (2013.01); *G02B 26/0808* (2013.01); *H04B 10/2941* (2013.01); *H04B 10/564* (2013.01); *Y02D 30/70* (2020.08)

(58) Field of Classification Search
USPC .......................................................... 398/94
See application file for complete search history.

(56) References Cited

U.S. PATENT DOCUMENTS

| | | | | |
|---|---|---|---|---|
| 2002/0196492 | A1* | 12/2002 | Trisnadi | G02B 6/272 |
| | | | | 398/79 |
| 2003/0053750 | A1* | 3/2003 | Yang | G02B 6/29311 |
| | | | | 385/27 |
| 2003/0086146 | A1 | 5/2003 | Meyers | |
| 2012/0328291 | A1* | 12/2012 | Frisken | H04Q 11/0005 |
| | | | | 398/48 |
| 2015/0212275 | A1* | 7/2015 | Mao | G02B 6/356 |
| | | | | 385/11 |
| 2016/0165324 | A1* | 6/2016 | Zhao | G02B 6/2938 |
| | | | | 398/48 |
| 2022/0137300 | A1* | 5/2022 | Li | H04B 10/2941 |
| | | | | 385/48 |
| 2023/0296842 | A1* | 9/2023 | Zhang | G02B 6/32 |
| | | | | 359/558 |

FOREIGN PATENT DOCUMENTS

| | | |
|---|---|---|
| CN | 103076655 A | 5/2013 |
| CN | 103091787 A | 5/2013 |
| CN | 103885122 A | 6/2014 |
| CN | 104459881 A | 3/2015 |
| CN | 104756422 A | 7/2015 |
| CN | 204855860 U | 12/2015 |
| EP | 1701580 A2 | 9/2006 |
| WO | WO-02075410 A1 * | 9/2002 ............. G02B 6/272 |

OTHER PUBLICATIONS

Office Action in Chinese Appln. No. 201910974368.0, dated Dec. 19, 2022, 5 pages.
Extended European Search Report issued in European Application No. 20876178.3 on Jul. 26, 2022, 11 pages.
Office Action issued in Chinese Application No. 201910974368.0 on Sep. 3, 2021, 18 pages (with English translation).
PCT International Search Report and Written Opinion issued in International Application No. PCT/CN2020/110897 on Nov. 18, 2020, 17 pages (with English translation).
Wei et al., "Dynamic gain equalization technologies for DWDM transmission system", Study On Communications, Issue 1, 2004, 4 pages (with English abstract).

* cited by examiner

POWER EQUALIZER AND ADJUSTMENT METHOD THEREFOR

CROSS-REFERENCE TO RELATED APPLICATIONS

This application is a continuation of International Application No. PCT/CN2020/110897, filed on Aug. 24, 2020, which claims priority to Chinese Patent Application No. 201910974368.0, filed on Oct. 14, 2019. The disclosures of the aforementioned applications are hereby incorporated by reference in their entireties.

TECHNICAL FIELD

This application relates to the field of optical communications, and in particular, to a power equalizer and an adjustment method therefor.

BACKGROUND

Power equalization is an important technology in Wavelength Division Multiplexing (WDM) systems. After a WDM signal with unequalized power passes through an Optical Fiber Amplifier (OFA), the unequalized power may be amplified. For example, for a long-haul transmission system including a plurality of cascaded Erbium-Doped Fiber Amplifiers (EDFAs), power of a signal with a specific wavelength may decrease or even cannot be detected, resulting in a decrease in a signal-to-noise ratio and an increase in a bit error rate. The unequalized signal power is mainly caused by an uneven gain spectrum of the EDFA, that is, unequalized gains for signals with different wavelengths. Therefore, power equalization of a WDM system can be achieved by gain equalization for the EDFA.

EDFA gain equalization using a filter is currently the most commonly used method. Filter-based gain equalization methods may further be classified into a static gain equalization technology and a dynamic gain equalization technology. Representative components of the two technologies are a Gain Flattening Filter (GFF) and a Dynamic Gain Equalizer (DGE), respectively. The GFF performs static gain equalization, and a filtering spectrum profile of the GFF cannot be changed and therefore cannot adapt to different gain spectrums of EDFAs. The GFF in combination with a Variable Optical Attenuator (VOA) can only implement translation of a filtering function, but cannot generate a filtering curve that fully meets requirements of optical amplification. Wide-range attenuation performed by the DGE is costly, and may further affect performance of a WDM link.

Therefore, a new type of power equalizer is urgently needed to implement dynamic gain equalization of a fiber amplifier more efficiently, while improving performance of a WDM link and reducing costs.

SUMMARY

In view of this, embodiments of this application provide a power equalizer and an adjustment method therefor, which can adjust a gain flattening curve of an optical signal more flexibly and efficiently in a fiber amplifier, thereby improving optical amplification performance.

According to a first aspect, an embodiment of this application provides a power equalizer, including an input/output assembly, a multiplexer/demultiplexer, a first pre-attenuation component, and a light beam modulator.

A first light beam is input from the input/output assembly. The multiplexer/demultiplexer demultiplexes the first light beam incident from the input/output assembly into a plurality of first sub-wavelength light beams, and propagates the plurality of first sub-wavelength light beams to the first pre-attenuation component. The first pre-attenuation component makes the first sub-wavelength light beam incident onto the light beam modulator at a preset angle, where the preset angle is an angle that deviates from a direction perpendicular to the light beam modulator, the preset angle is related to a preset amount of light energy attenuation of the first sub-wavelength light beam, and the preset amount of light energy attenuation of the first sub-wavelength light beam is related to a wavelength of the first sub-wavelength light beam. The light beam modulator is configured to perform angular deflection on the plurality of first sub-wavelength light beams passing through the first pre-attenuation component to obtain a plurality of second sub-wavelength light beams. The first pre-attenuation component propagates the plurality of second sub-wavelength light beams to the multiplexer/demultiplexer. The multiplexer/demultiplexer multiplexes the plurality of second sub-wavelength light beams into a second light beam. The second light beam is output from the input/output assembly.

In a possible implementation, the multiplexer/demultiplexer performs multiplexing and demultiplexing on a light beam, and may be a transmission grating, a reflection grating, or a grating prism, where the grating prism includes a reflection grating and a prism, the reflection grating is usually attached onto the prism, and the reflection grating implements spatial expansion of an input light spectrum, while the prism implements control of an input light aberration.

In a possible implementation, the first pre-attenuation component includes any one of the following components: a lens, a concave reflector, or a spherical reflector.

In a possible implementation, a relative position and a relative angle of inclination between the multiplexer/demultiplexer and the first pre-attenuation component are set such that the first sub-wavelength light beam is incident onto the light beam modulator at the preset angle corresponding to the first sub-wavelength light beam.

In a possible implementation, the relative position and the relative angle of inclination between the multiplexer/demultiplexer and the first pre-attenuation component include an angle of rotation of the multiplexer/demultiplexer, a distance between the multiplexer/demultiplexer and the first pre-attenuation component, and the like. When the multiplexer/demultiplexer is a grating prism, the relative position and the relative angle of inclination between the multiplexer/demultiplexer and the first pre-attenuation component further include an angle or an angle of rotation of a prism in the grating prism.

In a possible implementation, the preset angle is positively correlated with the preset amount of light energy attenuation of the first sub-wavelength light beam, and the preset amount of light energy attenuation of the first sub-wavelength light beam does not exceed a minimum value of an amount of light energy attenuation corresponding to the first slab-wavelength light beam in a gain flattening filtering curve of the power equalizer.

In a possible implementation, the input/output assembly includes a fiber array having a plurality of ports and/or a collimator array having a plurality of ports, and the fiber array having the plurality of ports and/or the collimator array having the plurality of ports include/includes at least one input port and at least one output port.

In a possible implementation, the power equalizer further includes a polarization assembly, and the polarization assembly is configured to unify polarizations of the first light beam.

In a possible implementation, the polarization assembly includes a polarizing beam splitter and a half-wave plate, where the polarizing beam splitter is configured to split a horizontal polarization component and a vertical polarization component of the first light beam that are mutually perpendicular into two parallel light beams, and the half-wave plate is configured to combine polarizations of the two parallel light beams into the polarized first light beam.

The power equalizer disclosed in this application is mainly applied in a fiber amplifier. A specific amount of attenuation is first performed on input light by the pre-attenuation component. When an optical signal reaches the light beam modulator, a dynamic range of optical signal attenuation to be performed by the light beam modulator is greatly narrowed. This can adjust a gain flattening curve of the optical signal more flexibly and efficiently, and greatly reduce a risk of performance degradation such as insertion loss caused by wide-range dynamic attenuation, thereby improving NF performance of a fiber amplifier and an OSNR of a WDM link.

According to a second aspect, an embodiment of this application provides a light beam adjustment method in a power equalizer, where the power equalizer includes an input/output assembly, a multiplexer/demultiplexer, a pre-attenuation component, and a light beam modulator. The method includes:

inputting, by the input/output assembly, a first light beam;

demultiplexing, by the multiplexer/demultiplexer, the first light beam into a plurality of first sub-wavelength light beams, and propagating the plurality of first sub-wavelength light beams to the pre-attenuation component;

adjusting a relative position and a relative angle of inclination between the multiplexer/demultiplexer and the pre-attenuation component such that the first sub-wavelength light beam is incident onto the light beam modulator at a preset angle, where the preset angle is an angle that deviates from a direction perpendicular to the light beam modulator, the preset angle corresponding to the first sub-wavelength light beam is related to a preset amount of light energy attenuation of the first sub-wavelength light beam, and the preset amount of light energy attenuation of the first sub-wavelength light beam is related to a wavelength of the first sub-wavelength light beam;

performing, by the light beam modulator, angular deflection on the plurality of first sub-wavelength light beams passing through the pre-attenuation component to obtain a plurality of second sub-wavelength light beams;

mapping, by the pre-attenuation component, the plurality of second sub-wavelength light beams onto the multiplexer/demultiplexer;

multiplexing, by the multiplexer/demultiplexer, the plurality of second sub-wavelength light beams into a second light beam; and outputting, by the input/output assembly, the second light beam.

In a possible implementation, the relative position and the relative angle of inclination between the multiplexer/demultiplexer and the first pre-attenuation component include an angle of rotation of the multiplexer/demultiplexer, a distance between the multiplexer/demultiplexer and the first pre-attenuation component, and the like. When the multiplexer/demultiplexer is a grating prism, the relative position and the relative angle of inclination between the multiplexer/demultiplexer and the first pre-attenuation component further include an angle or an angle of rotation of a prism in the grating prism.

In a possible implementation, before the demultiplexing, by the multiplexer/demultiplexer, the first light beam into a plurality of first sub-wavelength light beams, the method further includes:

splitting, by a polarizing beam splitter, a horizontal polarization component and a vertical polarization component of the first light beam that are mutually perpendicular into two parallel light beams; and combining, by a half-wave plate, polarizations of the two parallel light beams into the polarized first light beam.

According to a third aspect, an embodiment of this application provides another power equalizer. The power equalizer includes an input/output assembly, a second pre-attenuation component, a multiplexer/demultiplexer, an optical conversion component, and a light beam modulator.

A first light beam is input from the input/output assembly. The second pre-attenuation component is configured to separately perform light energy attenuation on a plurality of first sub-wavelength light beams in the first light beam, where an amount of light energy attenuation of the first sub-wavelength light beam is related to a wavelength of the first sub-wavelength light beam. The multiplexer/demultiplexer demultiplexes the first light beam passing through the second pre-attenuation component such that the plurality of first sub-wavelength light beams disperse, and propagates the plurality of first sub-wavelength light beams to the optical conversion component. The optical conversion component propagates the plurality of first sub-wavelength light beams to the light beam modulator. The light beam modulator performs angular deflection on the plurality of first sub-wavelength light beams to obtain a plurality of second sub-wavelength light beams. The optical conversion component propagates the plurality of second sub-wavelength light beams to the multiplexer/demultiplexer. The multiplexer/demultiplexer multiplexes the plurality of second sub-wavelength light beams into a second light beam. The second light beam is propagated to the input/output assembly by the second pre-attenuation component, and then is output from the input/output assembly.

In a possible implementation, the second pre-attenuation component is a passive filter and includes any one of the following components: a prism, coated glass, a waveguide, or a long-period grating.

In a possible implementation, the optical conversion component is a lens or a reflector. When the optical conversion component is a lens, the power equalizer further includes another lens, where the another lens is in front of the multiplexer/demultiplexer, a distance between the another lens and the multiplexer/demultiplexer is equal to a focal length of the another lens, and a distance between the optical conversion component and the multiplexer/demultiplexer is equal to a focal length of the optical conversion component.

In a possible implementation, the power equalizer further includes a polarization assembly, where the polarization assembly is located between the input/output assembly and the pre-attenuation component, and the polarization assembly is configured to unify polarizations of the first light beam.

In a possible implementation, the polarization assembly includes a polarizing beam splitter and a half-wave plate, where: the polarizing beam splitter is configured to split a horizontal polarization component and a vertical polarization component of the first light beam that are mutually perpendicular into two parallel light beams, and the half-wave plate is configured to combine polarizations of the two parallel light beams into the polarized first light beam.

The power equalizer disclosed in this embodiment is mainly applied in a fiber amplifier. The pre-attenuation component is added following the input/output assembly, and a specific amount of attenuation is first performed on input light. When an optical signal reaches the light beam modulator, a dynamic range of optical signal attenuation to be performed by the light beam modulator is greatly narrowed. This can adjust a gain flattening curve of the optical signal more flexibly and efficiently, thereby greatly improving optical amplification performance.

According to a fourth aspect, an embodiment of this application provides still another power equalizer. The power equalizer includes an input/output assembly, a second pre-attenuation component, a multiplexer/demultiplexer, an optical conversion component, and a light beam modulator.

A first light beam is input from the input/output assembly. The multiplexer/demultiplexer demultiplexes the first light beam into a plurality of first sub-wavelength light beams, and propagates the plurality of first sub-wavelength light beams to the second pre-attenuation component. The second pre-attenuation component separately performs light energy attenuation on the plurality of first sub-wavelength light beams, where an amount of light energy attenuation of the first sub-wavelength light beam is related to a wavelength of the first sub-wavelength light beam. The optical conversion component propagates the plurality of attenuated first sub-wavelength light beams to a first light beam modulator. The first light beam modulator performs angular deflection on the plurality of first sub-wavelength light beams to obtain a plurality of second sub-wavelength light beams. After the optical conversion component propagates the plurality of second sub-wavelength light beams to the pre-attenuation component, the multiplexer/demultiplexer multiplexes the plurality of second sub-wavelength light beams into a second light beam, and the second light beam is output from the input/output assembly.

In a possible implementation, the second pre-attenuation component is a passive filter and includes any one of the following components: a prism, coated glass, a waveguide, or a long-period grating.

In a possible implementation, the optical conversion component is a lens or a reflector. When the optical conversion component is a lens, the power equalizer further includes another lens, where the another lens is in front of the multiplexer/demultiplexer, a distance between the another lens and the multiplexer/demultiplexer is equal to a focal length of the another lens, and a distance between the optical conversion component and the multiplexer/demultiplexer is equal to a focal length of the optical conversion component.

In a possible implementation, a distance between the optical conversion component and the light beam modulator is equal to the focal length of the optical conversion component. When the distance between the optical conversion component and the light beam modulator is not equal to the focal length of the optical conversion component, an aberration is introduced. In this case, the first sub-wavelength light beams cannot be focused on the light beam modulator, which also causes some attenuation.

In a possible implementation, the power equalizer further includes a polarization assembly, where the polarization assembly is located between the input/output assembly and the pre-attenuation component, and the polarization assembly is configured to unify polarizations of the first light beam.

In a possible implementation, the polarization assembly includes a polarizing beam splitter and a half-wave plate, where the polarizing beam splitter is configured to split a horizontal polarization component and a vertical polarization component of the first light beam that are mutually perpendicular into two parallel light beams, and the half-wave plate is configured to combine polarizations of the two parallel light beams into the polarized first light beam.

The power equalizer and the adjustment method therefor provided in this application can adjust a gain flattening curve of an optical signal more flexibly and efficiently in a fiber amplifier, thereby improving optical amplification performance.

BRIEF DESCRIPTION OF DRAWINGS

To describe technical solutions in embodiments of this application or in the prior art more clearly, the following briefly describes the accompanying drawings for describing the background and the embodiments. Definitely, the following accompanying drawings merely describe some embodiments of this application, and a person of ordinary skill in the art may still derive other accompanying drawings or embodiments from these accompanying drawings and description without creative efforts, and this application is intended to cover all these derived accompanying drawings or embodiments.

DESCRIPTION OF EMBODIMENTS

The "connection" in embodiments of this application refers to a connection on an optical path. A person skilled in the art may understand that, specific optical components may not necessarily have an essential physical contact-type connection relationship, but spatial positions of these optical components and component features of these optical components enable these optical components to form a connection relationship on an optical path.

Figure 1A:
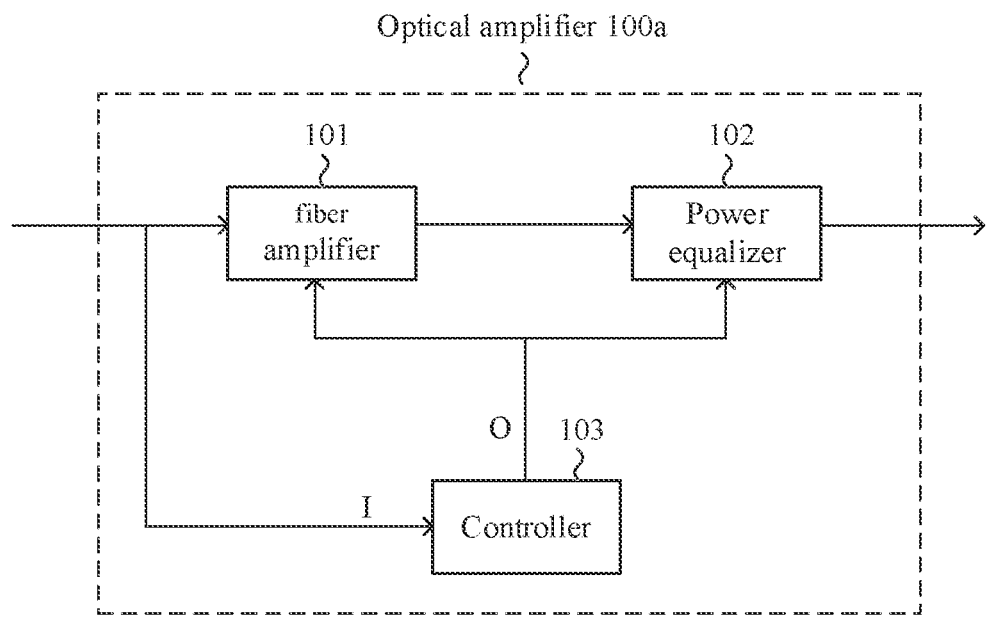
FIG. 1a is a schematic diagram of a structure of an optical amplifier according to an embodiment of this application.

FIG. 1a is a schematic diagram of a structure of an optical amplifier 100a according to an embodiment of this application. It can be learned from the figure that the optical amplifier includes: a fiber amplifier 101, a power equalizer 102, and a controller 103. The fiber amplifier 101 and the power equalizer 102 are sequentially connected, where an input terminal of the fiber amplifier is an input terminal of the optical amplifier, an output terminal of the power equalizer 102 is an output terminal of the optical amplifier. The controller includes a control input terminal I and a control output terminal O. The control input terminal I is configured to receive an input optical signal of the fiber amplifier, and the control output terminal O is configured to output an amplification control signal to the fiber amplifier 101, and output an adjustment control signal to the power equalizer 102. The power equalizer 102 is configured to perform power adjustment for each wavelength based on the adjustment control signal.

In this embodiment, a connection sequence of the fiber amplifier 101 and the power equalizer 102 is interchangeable, that is, the power equalizer 102 and the fiber amplifier 101 are sequentially connected. This is not limited in this application.

In this embodiment, the power equalizer 102 performing power adjustment for each wavelength based on the adjustment control signal refers to the power equalizer 102 implementing power adjustment for each wavelength by generating different insertion loss for each wavelength. In other words, based on a gain characteristic parameter of the fiber amplifier, power amplification of a corresponding multiple is implemented on an optical signal carrying different wavelengths. The power equalizer 102 generates different insertion loss values for the optical signal with different wavelengths, and the insertion loss values are applied to optical power of each wavelength output by the fiber amplifier. In this way, power adjustment is implemented for each wavelength.

In this embodiment, the controller may obtain the amplification control signal and the adjustment control signal by calculation based on the gain characteristic parameter of the fiber amplifier 101, an adjustment control characteristic parameter of the power equalizer 102, target output optical power information of the fiber amplifier, and the input optical signal of the fiber amplifier. The gain characteristic parameter of the fiber amplifier 101 may be a power amplification multiple of the fiber amplifier for each wavelength. The adjustment control characteristic parameter of the power equalizer 102 may be a relationship parameter between insertion loss of each wavelength and the adjustment control signal.

It may be understood that the fiber amplifier disclosed in this embodiment may obtain the amplification control signal and the adjustment control signal by calculation based on the input optical signal received by the input terminal. The amplification control signal may control the fiber amplifier to perform power amplification for each wavelength, the adjustment control signal may control the power equalizer to separately perform insertion loss adjustment for each wavelength, and an effect of insertion loss adjustment is applied to optical power of each wavelength of the fiber amplifier. In this way, single-wavelength gain adjustment is performed on a gain curve of the fiber amplifier, and adjustment precision of the gain curve of the fiber amplifier is improved.

Therefore, the gain curve of the fiber amplifier disclosed in this embodiment can be adjusted to be relatively flat, thereby improving system flatness, releasing a flatness margin designed in a system specification, and reducing a power equalizer station.

Figure 1B:
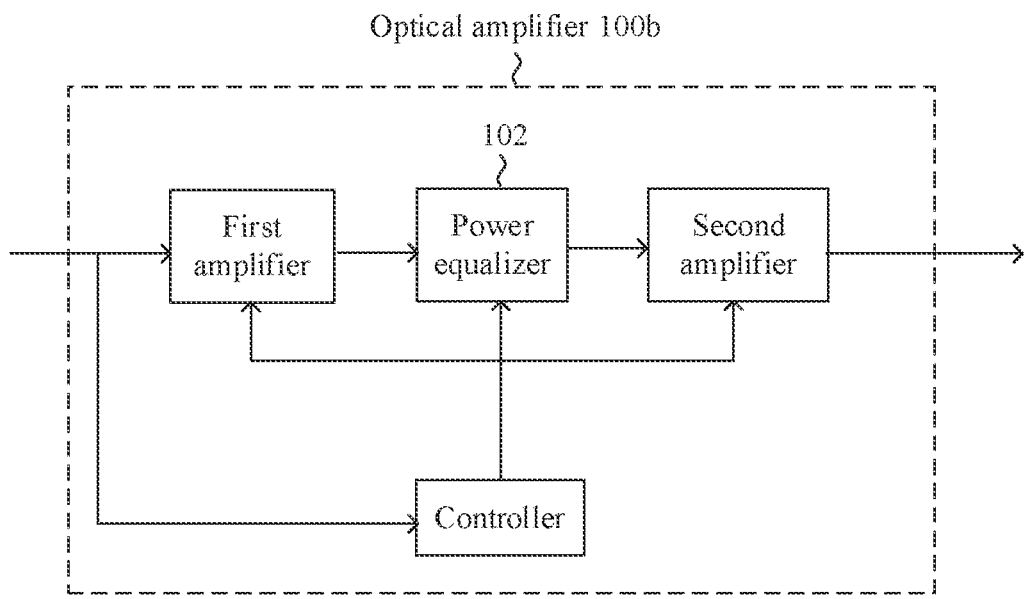
FIG. 1b is a schematic diagram of a structure of another optical amplifier according to an embodiment of this application.

The power equalizer disclosed in this embodiment of this application may be further applied to two stages of amplifiers (a first amplifier and a second amplifier), as shown in the optical amplifier 100b in FIG. 1b. Similarly, the power equalizer may be further applied to multiple stages of amplifiers such as three or more stages of amplifiers, and a principle is similar to that described above. Details are not described herein again.

The power equalizer disclosed in this embodiment of this application is mainly a rare-earth-doped fiber amplifier, for example, an EDFA. A person skilled in the art may learn that, with development of technologies, technologies in this application are also applicable to another rare-earth-doped fiber amplifier that is being developed or to be developed. The following describes the power equalizer technical solutions in some embodiments of this application with reference to the accompanying drawings in the embodiments of this application.

The terms such as "first" and "second" in this application are used to distinguish between similar objects, but are not used for describing a particular sequence or order. It should be understood that the data termed in such a way is interchangeable in proper situations, so that the embodiments described herein can be implemented in an order that is not described in this application. The term "and/or" is used to describe an association relationship between associated objects, and indicates that three relationships may exist. For example, A and/or B may indicate that A exists alone, both A and B exist, or B exists alone. A specific operation method in a method embodiment may also be applied to an apparatus embodiment. In addition, to more clearly reflect a relationship between components in different embodiments, in this application, same reference numerals are used to represent components with a same or similar function in different embodiments.

It should be further noted that, unless otherwise specified, specific descriptions of some technical features in one embodiment may also be applied to explain corresponding technical features mentioned in another embodiment. For example, description of a preset angle in FIG. 2b may also be applied to another related embodiment.

Figure 2A:
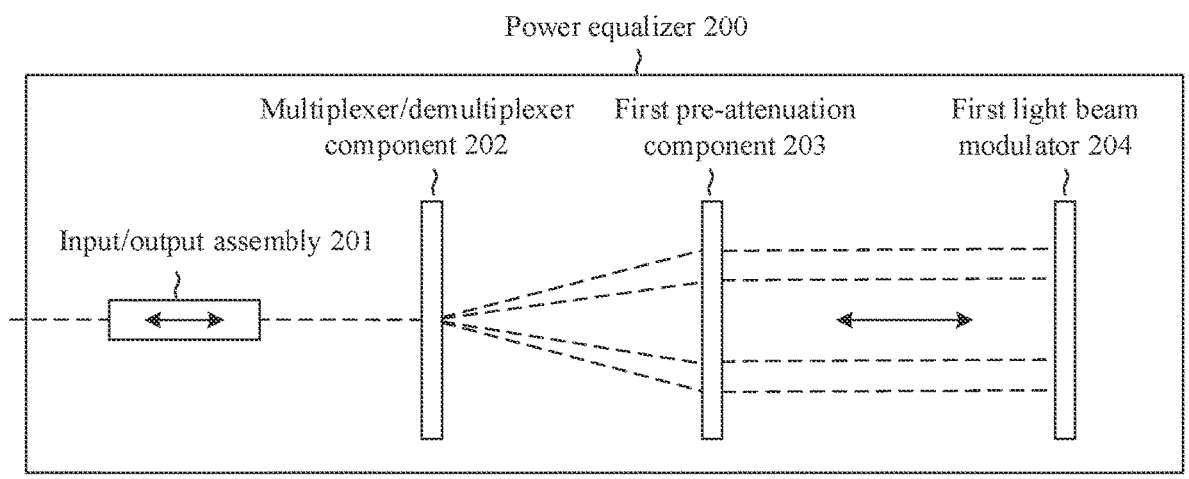
FIG. 2a is a schematic principle diagram of a structure of a power equalizer according to an embodiment of this application.

FIG. 2a is a schematic principle diagram of a structure of a power equalizer according to an embodiment of this application. As shown in FIG. 2a, the power equalizer 200 includes an input/output assembly 201, a multiplexer/demultiplexer 202, a first pre-attenuation component 203, and a first light beam modulator 204. A first light beam in this embodiment may be a WDM light beam. One WDM light beam may include a plurality of (at least two) sub-beams, and center wavelengths of the sub-beams (or center frequencies of the sub-beams) are different from each other.

The first light beam is input from the input/output assembly 201. The multiplexer/demultiplexer 202 demultiplexes the first light beam incident from the input/output assembly 201 into a plurality of first sub-wavelength light beams, and propagates the plurality of first sub-wavelength light beams to the first pre-attenuation component 203 (in FIG. 2a, one dashed line represents one light beam, and one light beam is decomposed into four light beams, which is only for illustration purposes, and actually may be decomposed into more light beams). The first pre-attenuation component 203 makes each of the plurality of first sub-wavelength light beams incident onto the first light beam modulator 204 at a corresponding preset angle, where the preset angle is related to a preset amount of light energy attenuation of a corresponding first sub-wavelength light beam in the plurality of first sub-wavelength light beams, and the preset amount of light energy attenuation of the first sub-wavelength light beam is related to a wavelength of the first sub-wavelength light beam. The first light beam modulator 204 is configured to perform angular deflection on the plurality of first sub-wavelength light beams passing through the first pre-attenuation component to obtain a plurality of second sub-wavelength light beams. The first pre-attenuation component 203 propagates the plurality of second sub-wavelength light beams to the multiplexer/demultiplexer 202. The multiplexer/demultiplexer 202 multiplexes the plurality of second sub-wavelength light beams into a second light beams. The second light beam is output from the input/output assembly 201.

The multiplexer/demultiplexer 202 performs multiplexing and demultiplexing on a light beam, and may be a transmission grating, a reflection grating, or a grating prism, where the grating prism includes a reflection grating and a prism, the reflection grating is usually attached onto the prism, and the reflection grating implements spatial expansion of an input light spectrum, while the prism implements control of an input light aberration.

The first pre-attenuation component 203 includes any one of the following components: a lens, a concave reflector, or a spherical reflector.

Figure 2B:
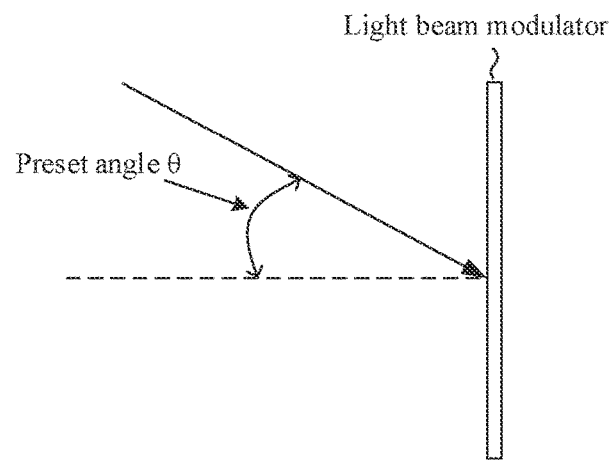
FIG. 2b is a schematic diagram illustrating a preset angle according to an embodiment of this application.

Specifically, a relative position and a relative angle of inclination between the multiplexer/demultiplexer 202 and the first pre-attenuation component 203 are set such that the first sub-wavelength light beam is incident onto the first light beam modulator 204 at the preset angle corresponding to the first sub-wavelength light beam, where the preset angle is an angle that deviates from a direction perpendicular to the light beam modulator. As shown in FIG. 2b, the preset angle herein is defined as an angle that deviates from the vertical direction. If a deviation direction is defined as positive, an opposite deviation is negative. An aberration may be introduced by adjusting the relative position and the relative angle of inclination between the multiplexer/demultiplexer 202 and the first pre-attenuation component 203, so that an incident angle of a light beam on a surface of the light beam modulator varies with a wavelength. In other words, the first sub-wavelength light beams can be incident onto the light beam modulator at their respective preset angles. The first sub-wavelength light beam is incident at the preset angle, and a corresponding angle of deflection is generated by specular reflection before the light beam modulator performs dynamic attenuation adjustment. There is specific attenuation after coupling and outputting, and attenuation is known upon the determining of an optical path. In other words, fixed pre-attenuation is implemented before dynamic attenuation by the light beam modulator.

Herein, the relative position and the relative angle of inclination between the multiplexer/demultiplexer 202 and the first pre-attenuation component 203 include an angle of rotation of the multiplexer/demultiplexer 202, a distance between the multiplexer/demultiplexer 202 and the first pre-attenuation component 203, and/or the like. When the multiplexer/demultiplexer 202 is a grating prism, the relative position and the relative angle of inclination between the multiplexer/demultiplexer 202 and the first pre-attenuation component 203 further include an angle or an angle of rotation of a prism in the grating prism.

Generally, the preset angle corresponding to each first sub-wavelength light beam is in a positive correlation with the preset amount of light energy attenuation corresponding to the first sub-wavelength light beam. To be specific, a larger preset angle indicates a larger preset amount of light energy attenuation. It should be noted that comparing preset angles is comparing absolute values thereof. Each of the plurality of first sub-wavelength light beams has a different wavelength. The preset amount of light energy attenuation corresponding to each first sub-wavelength light beam may be the same or different. Accordingly, the preset angle corresponding to each first sub-wavelength light beam may be the same or different.

Specifically, after the first sub-wavelength light beams are pre-attenuated by the first pre-attenuation component 203, liquid crystal phases and optical signal amplitudes or angles of different regions on the first light beam modulator 204 are controlled to deflect incident light, so as to separately control light energy attenuation of the first sub-wavelength light beams, and flatten a gain curve of the first light beam to obtain the second light beam. An angle of deflection of the first sub-wavelength light beam by the first light beam modulator 204 is related to an amount of dynamic attenuation corresponding to the first sub-wavelength light beam on the first light beam modulator 204.

The first light beam modulator 204 may be a MEMS (Micro-Electro-Mechanical System) or an LCoS (Liquid Crystal on Silicon). A phase grating is formed by loading a periodically varying grayscale map on the LCoS, to deflect reflected light, where an angle of deflection is generally positively correlated with a grating period. Coupling loss occurs when the reflected light is deflected and then reflected to an output port. The loss is positively correlated with the angle of deflection. Therefore, energy attenuation of the reflected light can be controlled by changing a period of the grayscale map on the LCoS. Light beams with different wavelengths are incident onto different regions on the LCoS, and grayscale maps with different periods are loaded in different regions, so that a preset filtering curve can be generated to flatten a gain spectrum of input light. When the gain spectrum changes, the loaded map may be updated again to generate a new corresponding flattening filtering curve, so as to implement the function of dynamic equalization of the input light.

A pre-attenuation curve formed by attenuation of the first sub-wavelength light beams by the first pre-attenuation component 203 and a dynamic attenuation curve of the first light beam modulator 204 are superimposed to form a gain flattening filtering curve of the power equalizer.

It should be noted that, in practical applications, a gain flattening curve is designed for the power equalizer, and the preset amount of light energy attenuation corresponding to each first sub-wavelength light beam does not exceed a minimum value of an amount of light energy attenuation corresponding to the first sub-wavelength light beam in all designed gain flattening filtering curves of the power equalizer.

In this embodiment of this application, the input/output assembly 201 includes a fiber array having a plurality of ports and/or a collimator array having a plurality of ports, where the fiber array having the plurality of ports and/or the collimator array having the plurality of ports include/includes at least one input port and at least one output port.

Optionally, the input/output assembly 201 may include a fiber array and/or a collimator array. The fiber array may include N input optical fibers (N is a positive integer) arranged in one dimension, where the N input optical fibers are used to obtain light beams from various dimensions. Specifically, the fiber array may include N input optical fibers arranged in one dimension on a port switching plane. The collimator array may include N collimators arranged in one dimension, and the N collimators correspond to the N input optical fibers respectively and are configured to convert light beams input by the N input optical fibers into collimated light beams. Specifically, the input collimator array may include N collimators arranged in one dimension on the port switching plane. The N collimators are in a one-to-one correspondence with the N input optical fibers. One collimator is configured to collimate a light beam output from a corresponding input optical fiber. This may also be understood as converting the light beam input from the input optical fiber into parallel light beams, and extending beam waist values of the light beams to facilitate subsequent optical path processing. Similarly, the input/output assembly 201 may include N dimension output ports for outputting a dimension, and the second light beam may be output from one of the N dimension output ports.

The input/output assembly 201 may further be connected to an external or built-in circulator, and the circulator is configured to separate an input and an output.

The power equalizer disclosed in this embodiment is mainly applied in a fiber amplifier. A specific amount of attenuation is first performed on input light by the pre-attenuation component. When an optical signal reaches the light beam modulator, a dynamic range of optical signal attenuation to be performed by the light beam modulator is greatly narrowed. This can adjust a gain flattening curve of the optical signal more flexibly and efficiently, and greatly reduce a risk of performance degradation such as insertion loss caused by wide-range dynamic attenuation, thereby improving NF (Noise Figure) performance of a fiber amplifier and an OSNR (Optical Signal-to-Noise Ratio) of a WDM link.

Figure 3:
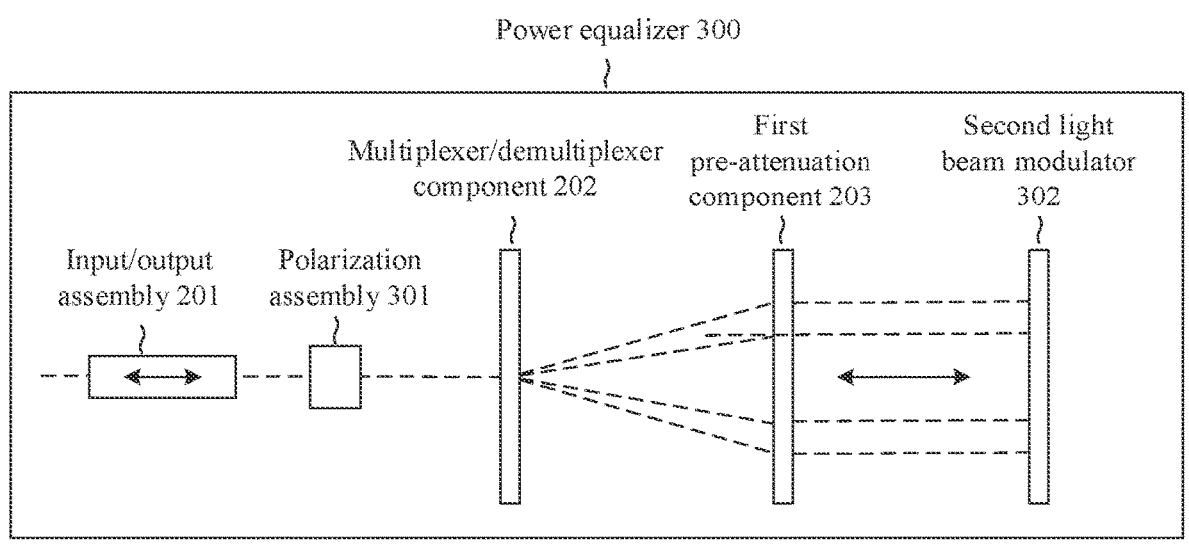
FIG. 3 is a schematic principle diagram of a structure of another power equalizer according to an embodiment of this application.

FIG. 3 is a schematic principle diagram of a structure of another power equalizer according to an embodiment of this application. As shown in FIG. 3, the power equalizer 300 includes an input/output assembly 201, a polarization assembly 301, a multiplexer/demultiplexer 202, a first pre-attenuation component 203, and a second light beam modulator 302.

A first light beam is input from the input/output assembly 201. The polarization assembly 301 unifies polarizations of the collimated first light beam. The polarized first light beam is demultiplexed on the multiplexer/demultiplexer 202. The multiplexer/demultiplexer 202 demultiplexes the first light beam into a plurality of first sub-wavelength light beams, and propagates the plurality of first sub-wavelength light beams to the first pre-attenuation component 203. The first pre-attenuation component 203 makes each of the plurality of first sub-wavelength light beams incident onto the second light beam modulator 302 at a corresponding preset angle, where the preset angle is related to a preset amount of light energy attenuation of a corresponding first sub-wavelength light beam in the plurality of first sub-wavelength light beams, and the preset amount alight energy attenuation of the first sub-wavelength light beam is related to a wavelength of the first sub-wavelength light beam. The second light beam modulator 302 is configured to perform angular deflection on the plurality of first sub-wavelength light beams passing through the first pre-attenuation component to obtain a plurality of second sub-wavelength light beams. The first pre-attenuation component 203 propagates the plurality of second sub-wavelength light beams to the multiplexer/demultiplexer 202. The multiplexer/demultiplexer 202 multiplexes the plurality of second sub-wavelength light beams into a second light beam. The second light beam is output from the input/output assembly 201.

For related description of the input/output assembly 201, the multiplexer/demultiplexer 202, and the first pre-attenuation component 203, refer to the embodiment corresponding to FIG. 2a. Details are not described herein again.

A relative position and a relative angle of inclination between the multiplexer/demultiplexer 202 and the first pre-attenuation component 203 are set such that the first sub-wavelength light beam is incident onto the second light beam modulator 302 at the preset angle corresponding to the first sub-wavelength light beam, where the preset angle is an angle that deviates from a direction perpendicular to the light beam modulator.

The relative position and the relative angle of inclination between the multiplexer/demultiplexer 202 and the first pre-attenuation component 203 include an angle of rotation of the multiplexer/demultiplexer 202, a distance between the multiplexer/demultiplexer 202 and the first pre-attenuation component 203, a distance between the multiplexer/demultiplexer 202 and the polarization assembly 301, or the like. When the multiplexer/demultiplexer 202 is a grating prism, the relative position and the relative angle of inclination between the multiplexer/demultiplexer 202 and the first pre-attenuation component 203 further include an angle or an angle of rotation of a prism in the grating prism.

Specifically, the polarization assembly 301 includes a polarizing beam splitter and a half-wave plate, where the polarizing beam splitter is configured to split a horizontal polarization component and a vertical polarization component of the first light beam that are mutually perpendicular into two parallel light beams. The half-wave plate is configured to combine polarizations of the two parallel light beams into the polarized first light beam, for example, rotate a vertically polarized light beam 90 degrees to a horizontally polarized beam, and unify polarizations of the first light beam into the horizontal polarization. The distance between the multiplexer/demultiplexer 202 and the polarization assembly 301 may be specifically a distance between the multiplexer/demultiplexer 202 and the polarizing beam splitter.

A difference between the second light beam modulator 302 and the second light beam modulator 302 in the embodiment of FIG. 2a lies in that the second light beam modulator 302 may usually be a polarization-dependent LCOS or LC (Liquid Crystal). In the LCOS technology, a principle of a liquid crystal grating is used to adjust an angle of reflection of light with different wavelengths, so as to separate light. The LCoS technology is highly reliable due to the absence of moving parts. In the LCoS technology, a change in a refractive index of a liquid crystal cell is controlled to implement a change in an angle of reflection, so that extension and upgrade can be easily implemented. Different channels correspond to different regions of a spatial light modulator (liquid crystal) array, and a transmission direction of light is changed by adjusting a phase of a light spot. Rotation of a polarization state of a light beam can be controlled by applying a voltage to the LC, and then attenuation of light with different wavelengths can be implemented after the light beam passes through an analyzer. The analyzer is also a Polaroid, which is mainly used to convert incident light into linearly polarized light and transmit the linearly polarized light. The Polaroid is referred to as a polarizer when placed on a light source assembly, and is configured to convert light emitted from a light source into linearly polarized light. The Polaroid is referred to as an analyzer when placed in front of a photoelectric sensor to detect a polarization state of a light beam.

Figure 4:
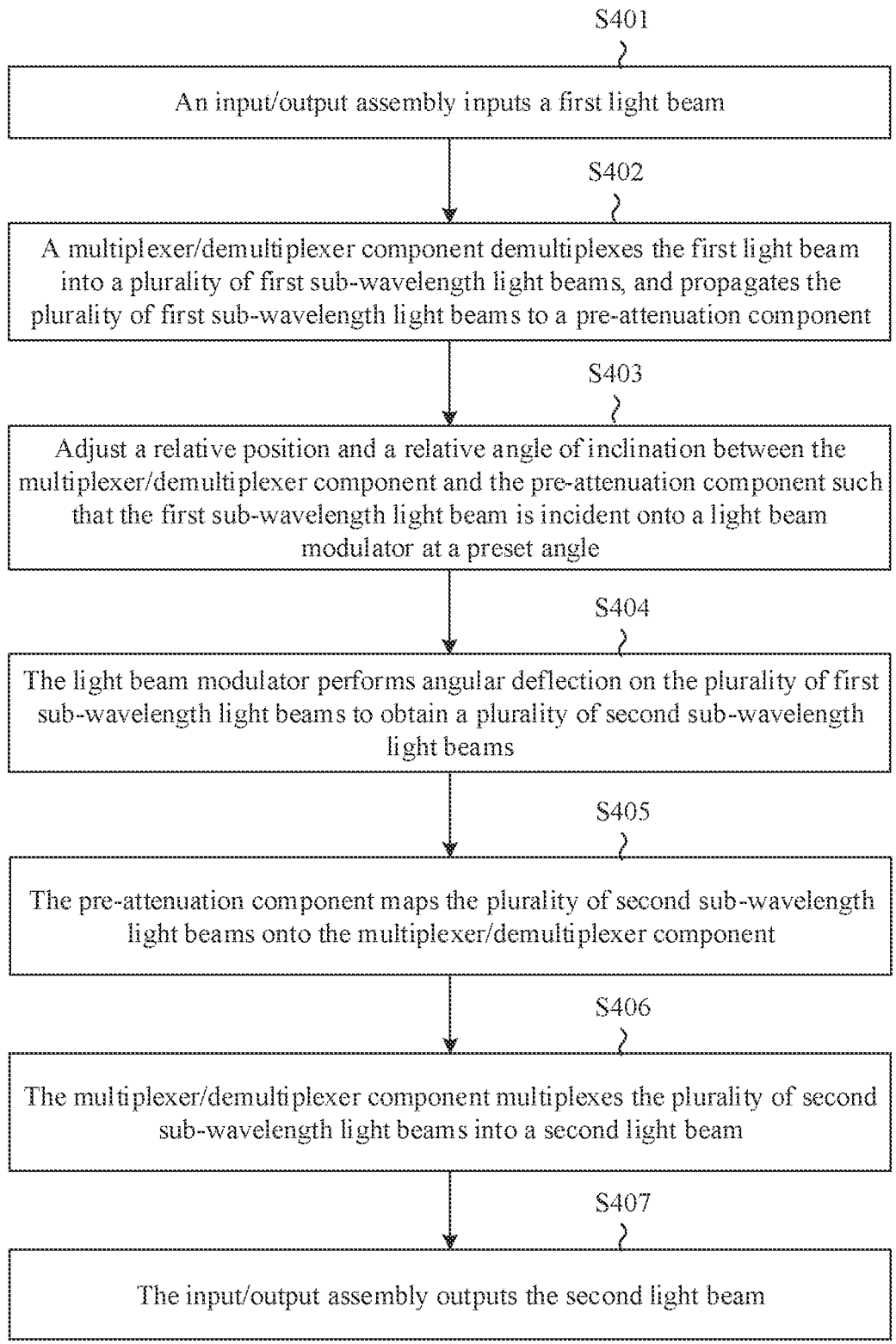
FIG. 4 is a flowchart of an adjustment method for a power equalizer according to an embodiment of this application.

FIG. 4 is a flowchart of a light beam adjustment method in a power equalizer according to an embodiment of this application. As shown in FIG. 4, the light beam adjustment method in the power equalizer is applied to the power equalizer provided in the foregoing embodiment. The method includes the following steps.

S401: An input/output assembly inputs a first light beam.

S402: A multiplexer/demultiplexer demultiplexes the first light beam into a plurality of first sub-wavelength light beams, and propagates the plurality of first sub-wavelength light beams to a first pre-attenuation component.

S403: Adjust a relative position and a relative angle of inclination between the multiplexer/demultiplexer and the first pre-attenuation component such that the first sub-wavelength light beam is incident onto a light beam modulator at a preset angle.

The preset angle is an angle that deviates from a direction perpendicular to the light beam modulator, the preset angle corresponding to the first sub-wavelength light beam is related to a preset amount of light energy attenuation of the first sub-wavelength light beam, and the preset amount of light energy attenuation of the first sub-wavelength light beam is related to a wavelength of the first sub-wavelength light beam. Generally, the preset angle corresponding to each first sub-wavelength light beam is in a positive correlation with the preset amount of light energy attenuation corresponding to the first sub-wavelength light beam. To be specific, a larger preset amount of light energy attenuation indicates a larger preset angle.

S404: The light beam modulator performs angular deflection on the plurality of first sub-wavelength light beams passing through the first pre-attenuation component to obtain a plurality of second sub-wavelength light beams.

S405: The first pre-attenuation component maps the plurality of second sub-wavelength light beams onto the multiplexer/demultiplexer.

S406: The multiplexer/demultiplexer multiplexes the plurality of second sub-wavelength light beams into a second light beam.

S407: The input/output assembly outputs the second light beam.

Optionally, before step S402 in which the multiplexer/demultiplexer demultiplexes the first light beam into the plurality of first sub-wavelength light beams, the method further includes splitting, by a polarizing beam splitter, a horizontal polarization component and a vertical polarization component of the first light beam that are mutually perpendicular into two parallel light beams; and combining, by a half-wave plate, polarizations of the two parallel light beams into the polarized first light beam.

The method described in this embodiment corresponds to the device embodiments described in FIG. 2a to FIG. 3. Related parts can be mutually referred, and details are not described herein again.

Figure 5:
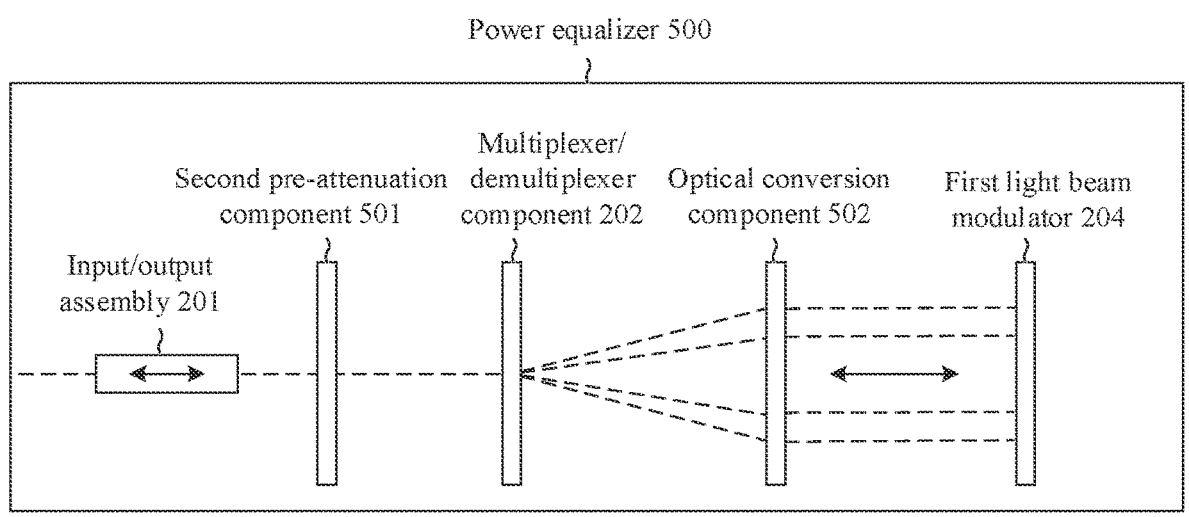
FIG. 5 is a schematic principle diagram of a structure of still another power equalizer according to an embodiment of this application.

FIG. 5 is a schematic principle diagram of a structure of still another power equalizer according to an embodiment of this application. As shown in FIG. 5, the power equalizer 500 includes an input/output assembly 201, a second pre-attenuation component 501, multiplexer/demultiplexer 202, an optical conversion component 502, and a first light beam modulator 204.

A first light beam is input from the input/output assembly 201. The second pre-attenuation component 501 is configured to separately perform light energy attenuation on a plurality of first sub-wavelength light beams in the first light beam, where an amount of light energy attenuation of the first sub-wavelength light beam is related to a wavelength of the first sub-wavelength light beam. The multiplexer/demultiplexer 202 demultiplexes the first light beam passing through the second pre-attenuation component 501 such that the plurality of first sub-wavelength light beams disperse, and propagates the plurality of first sub-wavelength light beams to the optical conversion component 502. The optical conversion component 502 propagates the plurality of first sub-wavelength light beams to the first light beam modulator 204. The first light beam modulator 204 performs angular deflection on the plurality of first sub-wavelength light beams to obtain a plurality of second sub-wavelength light beams. The optical conversion component 502 propagates the plurality of second sub-wavelength light beams to the multiplexer/demultiplexer 202. The multiplexer/demultiplexer 202 multiplexes the plurality of second sub-wavelength light beams into a second light beam. The second light beam is propagated to the input/output assembly 201 by the second pre-attenuation component 501, and then is output from the input/output assembly 201.

In this embodiment, the second pre-attenuation component 501 may be any one of the following components: a passive filter such as a prism, coated glass, a waveguide, or a long-period grating that generates different aberrations based on different wavelengths.

Specifically, the second pre-attenuation component 501 performs preset attenuation for each first sub-wavelength light beam, where each of the plurality of first sub-wavelength light beams has a different wavelength, and the preset amount of light energy attenuation corresponding to each first sub-wavelength light beam may be the same or different.

The optical conversion component 502 may be a spherical lens or a spherical reflector.

For related description of the input/output assembly 201, the multiplexer/demultiplexer 202, and the first light beam modulator 204 in this embodiment, refer to the embodiment corresponding to FIG. 2a.

The power equalizer disclosed in this embodiment is mainly applied in a fiber amplifier. The pre-attenuation component is added following the input/output assembly, and a specific amount of attenuation is first performed on input light. When an optical signal reaches the light beam modulator, a dynamic range of optical signal attenuation to be performed by the light beam modulator is greatly narrowed. This can adjust a gain flattening curve of the optical signal more flexibly and efficiently, and greatly reduce a risk of performance degradation such as insertion loss caused by wide-range dynamic attenuation, thereby improving NF performance of a fiber amplifier and an OSNR of a WDM link.

Figure 6:
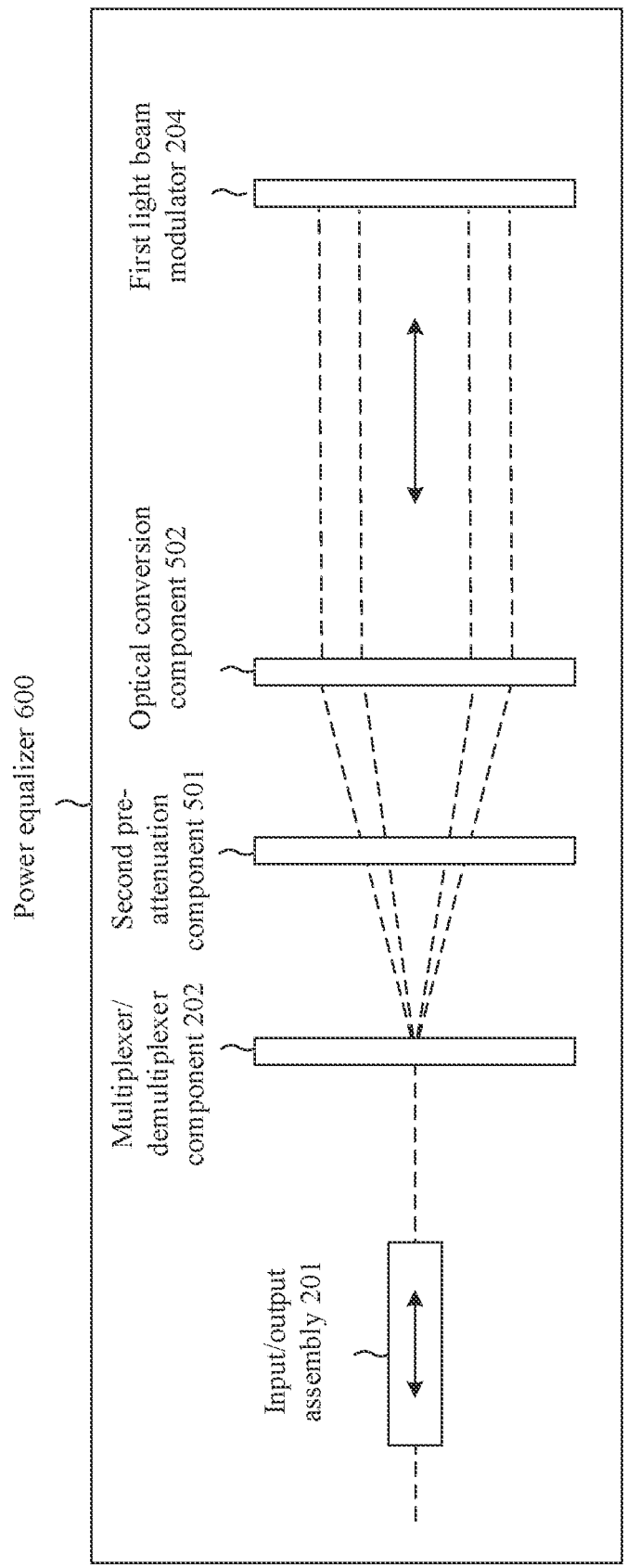
FIG. 6 is a schematic principle diagram of a structure of yet another power equalizer according to an embodiment of this application.

FIG. 6 is a schematic principle diagram of a structure of yet another power equalizer according to an embodiment of this application. As shown in FIG. 6, a difference between the power equalizer 600 and the power equalizer 500 lies in that the second pre-attenuation component 501 of the power equalizer 500 is located between the input/output assembly 201 and the multiplexer/demultiplexer 202, while the second pre-attenuation component 501 of the power equalizer 600 is located between the multiplexer/demultiplexer 202 and the optical conversion component 502.

A first light beam is input from the input/output assembly 201. The multiplexer/demultiplexer 202 demultiplexes the first light beam into a plurality of first sub-wavelength light beams, and propagates the plurality of first sub-wavelength light beams to the second pre-attenuation component 501.

The second pre-attenuation component 501 separately performs light energy attenuation on the plurality of first sub-wavelength light beams, where an amount of light energy attenuation of the first sub-wavelength light beam is related to a wavelength of the first sub-wavelength light beam. The optical conversion component 502 propagates the plurality of attenuated first sub-wavelength light beams to a first light beam modulator 204. The first light beam modulator 204 performs angular deflection on the plurality of first sub-wavelength light beams to obtain a plurality of second sub-wavelength light beams. After the optical conversion component 502 propagates the plurality of second sub-wavelength light beams to the second pre-attenuation component 501, the multiplexer/demultiplexer 202 multiplexes the plurality of second sub-wavelength light beams into a second light beam, and the second light beam is output from the input/output assembly 201.

For other related description of the input/output assembly 201, the multiplexer/demultiplexer 202, and the first light beam modulator 204 in this embodiment, refer to the foregoing embodiments, and details are not described herein again.

Figure 7:
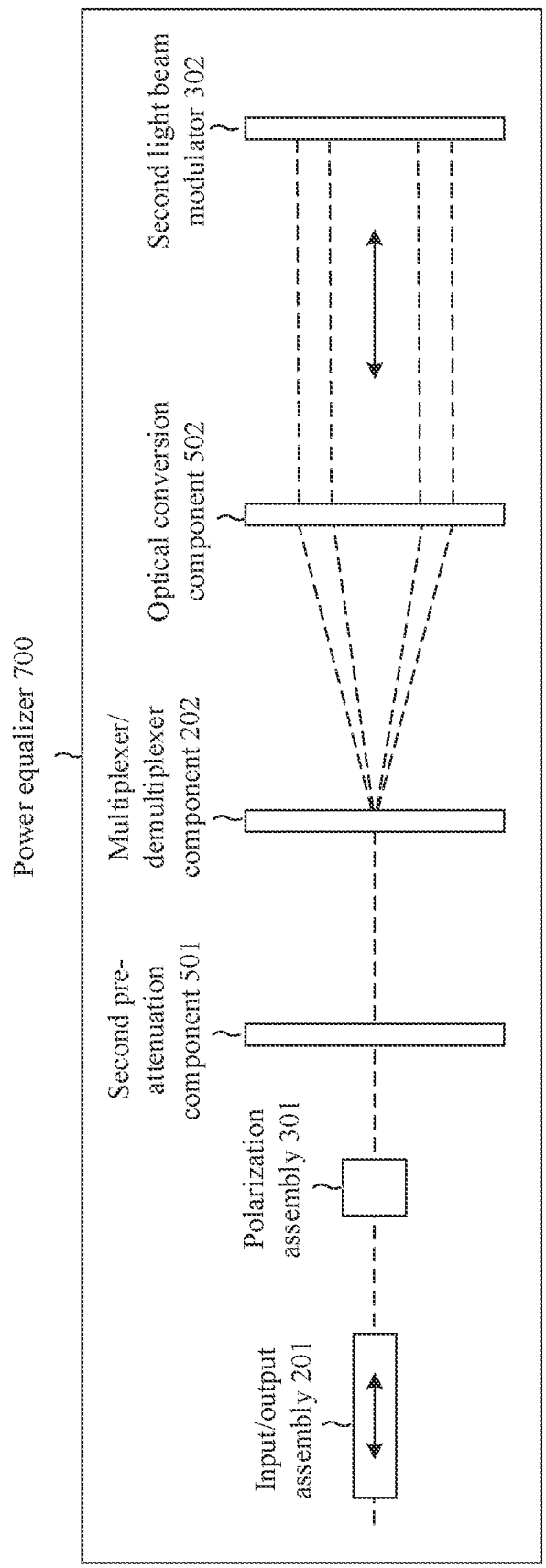
FIG. 7 is a schematic principle diagram of a structure of still yet another power equalizer according to an embodiment of this application.

FIG. 7 is a schematic principle diagram of a structure of still yet another power equalizer according to an embodiment of this application. As shown in FIG. 7, the power equalizer 700 includes an input/output assembly 201, a polarization assembly 301, a second pre-attenuation component 501, a multiplexer/demultiplexer 202, an optical conversion component 502, and a second light beam modulator 302.

A first light beam is input from the input/output assembly 201. The polarization assembly 301 unifies polarizations of the collimated first light beam. The polarized first light beam is demultiplexed on the multiplexer/demultiplexer 202. The multiplexer/demultiplexer 202 demultiplexes the first light beam into a plurality of first sub-wavelength light beams, and propagates the plurality of first sub-wavelength light beams to the second pre-attenuation component 501. The second pre-attenuation component 501 separately performs light energy attenuation on the plurality of first sub-wavelength light beams, where an amount of light energy attenuation of the first sub-wavelength light beam is related to a wavelength of the first sub-wavelength light beam. The optical conversion component 502 propagates the plurality of attenuated first sub-wavelength light beams to the second light beam modulator 302. After the second light beam modulator 302 performs angular deflection on the plurality of first sub-wavelength light beams to obtain a plurality of second sub-wavelength light beams, the plurality of second sub-wavelength light beams pass through the optical conversion component 502 and the second pre-attenuation component 501, the multiplexer/demultiplexer 202 multiplexes the plurality of second sub-wavelength light beams into a second light beam, and the second light beam is output from the input/output assembly 201.

Figure 8:
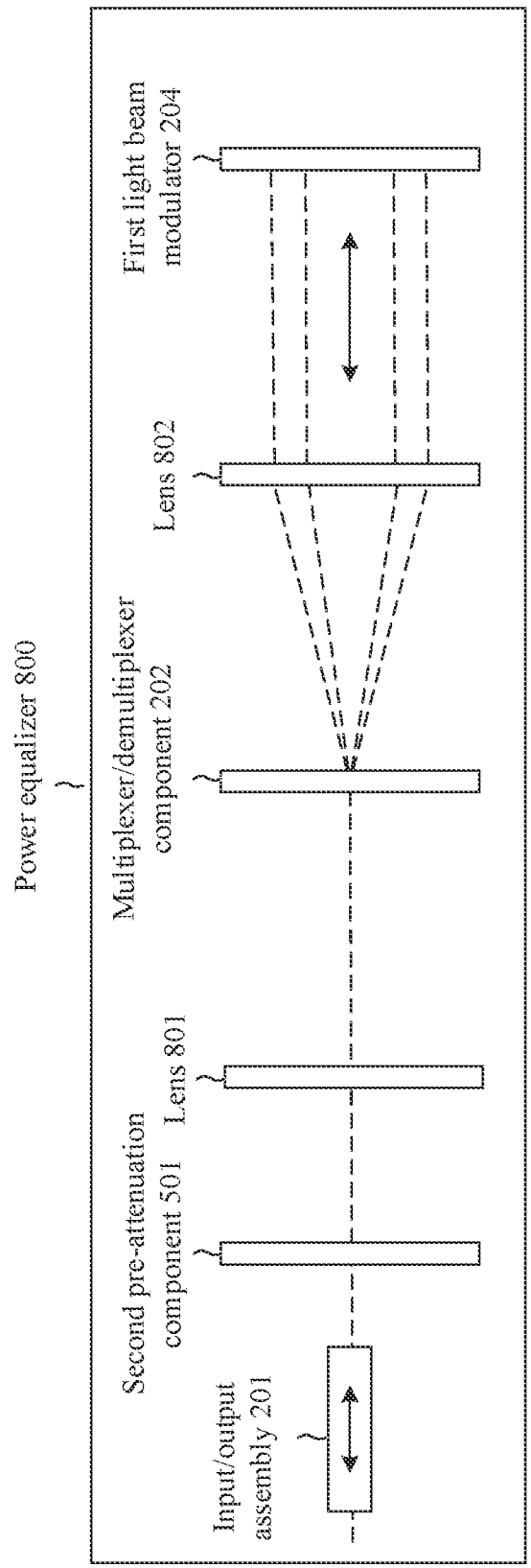
FIG. 8 is a schematic principle diagram of a structure of a further power equalizer according to an embodiment of this application.

FIG. 8 is a schematic principle diagram of a structure of a further power equalizer according to an embodiment of this application. As shown in FIG. 8, the power equalizer 800 includes an input/output assembly 201, a second pre-attenuation component 501, a lens 801, a multiplexer/demultiplexer 202, a lens 802, and a first light beam modulator 204.

A first light beam is input from the input/output assembly 201. The second pre-attenuation component 501 is configured to separately perform light energy attenuation on a plurality of first sub-wavelength light beams in the first light beam, where an amount of light energy attenuation of the first sub-wavelength light beam is related to a wavelength of the first sub-wavelength light beam. The lens 801 maps the first light beam onto the multiplexer/demultiplexer 202. The multiplexer/demultiplexer 202 performs demultiplexing such that the plurality of first sub-wavelength light beams disperse, and propagates the plurality of first sub-wavelength light beams to the lens 802. The lens 802 propagates the plurality of first sub-wavelength light beams to the first light beam modulator 204. The first light beam modulator 204 performs angular deflection on the plurality of first sub-wavelength light beams to obtain a plurality of second sub-wavelength light beams. The second sub-wavelength light beams are mapped onto the multiplexer/demultiplexer 202 again by the lens 802, and are multiplexed into a second light beam. The second light beam passes through the lens 801 and the second pre-attenuation component 501, and is output from the input/output assembly 201.

Optionally, the lens 801 and the lens 802 have a same focal length. A distance between the lens 801 and the multiplexer/demultiplexer 202 is equal to the focal length of the lens 801, and a distance between the lens 802 and the multiplexer/demultiplexer 202 is equal to the focal length of the lens 802, so as to form a 4f (f is the focal length of the lens) system. It should be noted that FIG. 8 is merely an illustration. The lens 801 and the lens 802 may alternatively be replaced by other components, such as a spherical reflector, which is not limited herein.

Optionally, a distance between the lens 802 and the first light beam modulator 204 is equal to the focal length of the lens 802. When the distance between the lens 802 and the first light beam modulator 204 is not equal to the focal length of the lens 802, an aberration is introduced. In this case, the first sub-wavelength light beams cannot be focused on the first light beam modulator 204, which also causes some light energy attenuation.

Figure 9:
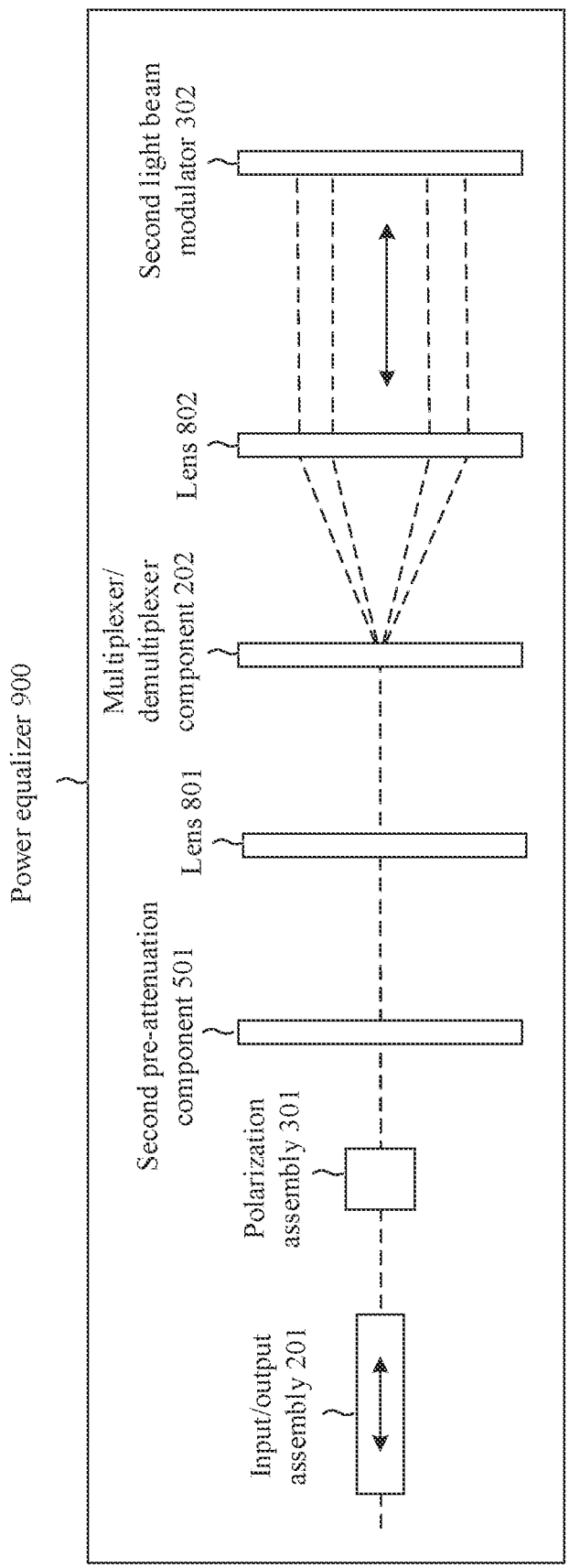
FIG. 9 is a schematic principle diagram of a structure of a still further power equalizer according to an embodiment of this application.

FIG. 9 is a schematic principle diagram of a structure of a still further power equalizer according to an embodiment of this application. As shown in FIG. 9, the power equalizer 900 includes an input and output component 201, a polarization assembly 301, a second pre-attenuation component 501, a lens 801, a multiplexer/demultiplexer 202, a lens 802, and a second light beam modulator 302.

Optionally, the lens 801 and the lens 802 have a same focal length. A distance between the lens 801 and the multiplexer/demultiplexer 202 is equal to the focal length of the lens 801, and a distance between the lens 802 and the multiplexer/demultiplexer 202 is equal to the focal length of the lens 802, so as to form a 4f (f is the focal length of the lens) system.

Optionally, a distance between the lens 802 and the second light beam modulator 302 is equal to the focal length of the lens 802.

Same and similar parts in the embodiments of this specification can be mutually referred. In particular, for the embodiments corresponding to FIG. 7 to FIG. 9 that are described relatively briefly, refer to the foregoing embodiments.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A power equalizer, comprising:
an input/output assembly, a multiplexer/demultiplexer, a pre-attenuator, and a light beam modulator, wherein:
the input/output assembly is configured to input a first light beam;
the multiplexer/demultiplexer is configured to demultiplex the first light beam into a plurality of first sub-wavelength light beams comprising a first sub-wavelength light beam, and propagate the plurality of first sub-wavelength light beams to the pre-attenuator;
the pre-attenuator is configured to perform light energy attenuation on the first sub-wavelength light beam and make the first sub-wavelength light beam incident onto the light beam modulator at a preset angle, wherein the preset angle is related to a preset amount of light energy attenuation of the first sub-wavelength light beam, and the preset amount of light energy attenuation of the first sub-wavelength light beam is related to a wavelength of the first sub-wavelength light beam;
the light beam modulator is configured to perform angular deflection on the plurality of first sub-wavelength light beams passing through the pre-attenuator to obtain a plurality of second sub-wavelength light beams;
the pre-attenuator is further configured to propagate the plurality of second sub-wavelength light beams to the multiplexer/demultiplexer;
the multiplexer/demultiplexer is further configured to multiplex the plurality of second sub-wavelength light beams into a second light beam; and
the input/output assembly is further configured to output the second light beam.

2. The power equalizer according to claim 1, wherein a relative position and a relative angle of inclination between the multiplexer/demultiplexer and the pre-attenuator are set such that the first sub-wavelength light beam is incident onto the light beam modulator at the preset angle.

3. The power equalizer according to claim 2, wherein the relative position and the relative angle of inclination between the multiplexer/demultiplexer and the pre-attenuator comprise at least one of an angle of rotation of the multiplexer/demultiplexer or a distance between the multiplexer/demultiplexer and the pre-attenuator.

4. The power equalizer according to claim 1, wherein the preset angle is positively correlated with the preset amount of light energy attenuation of the first sub-wavelength light beam, and the preset amount of light energy attenuation of the first sub-wavelength light beam does not exceed a minimum value of an amount of light energy attenuation corresponding to the first sub-wavelength light beam in a gain flattening filtering curve of the power equalizer.

5. The power equalizer according to claim 1, wherein the pre-attenuator comprises at least one of a lens, a concave reflector, or a spherical reflector.

6. The power equalizer according to claim 1, wherein the input/output assembly comprises at least one of a fiber array having a plurality of ports or a collimator array having a plurality of ports, and the fiber array or the collimator array comprises at least one input port and at least one output port.

7. The power equalizer according to claim 1, wherein the power equalizer further comprises a polarization assembly, and the polarization assembly comprises a polarizing beam splitter and a half-wave plate, wherein the polarizing beam splitter is configured to split a horizontal polarization component and a vertical polarization component of the first light beam that are mutually perpendicular into two parallel light beams, and the half-wave plate is configured to combine polarizations of the two parallel light beams into a polarized first light beam.

8. A power equalizer, comprising:
an input/output assembly, a pre-attenuator, a multiplexer/demultiplexer, an optical convertor, and a light beam modulator, wherein:
the input/output assembly is configured to input a first light beam;
the pre-attenuator is configured to separately perform light energy attenuation on a plurality of first sub-wavelength light beams in the first light beam, wherein the plurality of first sub-wavelength light beams comprise a first sub-wavelength light beam, wherein an amount of light energy attenuation of the first sub-wavelength light beam is related to a wavelength of the first sub-wavelength light beam;
the multiplexer/demultiplexer is configured to demultiplex the first light beam passing through the pre-attenuator such that the plurality of first sub-wavelength light beams disperse, and propagate the plurality of first sub-wavelength light beams to the optical convertor;
the optical convertor is configured to propagate the plurality of first sub-wavelength light beams to the light beam modulator;
the light beam modulator is configured to perform angular deflection on the plurality of first sub-wavelength light beams to obtain a plurality of second sub-wavelength light beams;
the optical convertor is further configured to propagate the plurality of second sub-wavelength light beams to the multiplexer/demultiplexer;
the multiplexer/demultiplexer is further configured to multiplex the plurality of second sub-wavelength light beams into a second light beam;
the pre-attenuator is further configured to propagate the second light beam to the input/output assembly; and
the input/output assembly is further configured to output the second light beam.

9. The power equalizer according to claim 8, wherein the pre-attenuator is a passive filter and comprises at least one of a prism, coated glass, a waveguide, or a long-period grating.

10. The power equalizer according to claim 8, wherein:
the optical convertor is a lens or a reflector; and
when the optical convertor is a lens, the power equalizer further comprises an additional lens, wherein the additional lens is in front of the multiplexer/demultiplexer, a distance between the additional lens and the multiplexer/demultiplexer is equal to a focal length of the additional lens, a distance between the optical convertor and the multiplexer/demultiplexer is equal to a focal length of the optical convertor, and a distance between the optical convertor and the light beam modulator is equal to the focal length of the optical convertor.

11. The power equalizer according to claim 8, wherein the power equalizer further comprises a polarization assembly, the polarization assembly is located between the input/output assembly and the pre-attenuator, and the polarization assembly is configured to unify polarizations of the first light beam.

12. The power equalizer according to claim 8, wherein the power equalizer further comprises a polarization assembly, wherein the polarization assembly comprises a polarizing beam splitter and a half-wave plate, the polarizing beam splitter is configured to split a horizontal polarization component and a vertical polarization component of the first light beam that are mutually perpendicular into two parallel light beams, and the half-wave plate is configured to combine polarizations of the two parallel light beams into a polarized first light beam.

13. A power equalizer, comprising:
an input/output assembly, a multiplexer/demultiplexer, a pre-attenuator, an optical convertor, and a light beam modulator, wherein:
the input/output assembly is configured to input a first light beam;
the multiplexer/demultiplexer is configured to demultiplex the first light beam into a plurality of first sub-wavelength light beams comprising a first sub-wavelength light beam, and propagate the plurality of first sub-wavelength light beams to the pre-attenuator;
the pre-attenuator is configured to separately perform light energy attenuation on the plurality of first sub-wavelength light beams in the first light beam, wherein an amount of light energy attenuation of the first sub-wavelength light beam is related to a wavelength of the first sub-wavelength light beam;
the optical convertor is configured to propagate the plurality of first sub-wavelength light beams passing through the pre-attenuator to the light beam modulator;
the light beam modulator is configured to perform angular deflection on the plurality of first sub-wavelength light beams to obtain a plurality of second sub-wavelength light beams;
the optical convertor is further configured to propagate the plurality of second sub-wavelength light beams to the pre-attenuator;
the pre-attenuator is further configured to propagate the plurality of second sub-wavelength light beams to the multiplexer/demultiplexer;
the multiplexer/demultiplexer is further configured to multiplex the plurality of second sub-wavelength light beams into a second light beam; and
the input/output assembly is further configured to output the second light beam.

14. The power equalizer according to claim 13, wherein the pre-attenuator is a passive filter and comprises at least one of a prism, coated glass, a waveguide, or a long-period grating.

15. The power equalizer according to claim 13, wherein:
the optical convertor is a lens or a reflector; and
when the optical convertor is a lens, the power equalizer further comprises an additional lens, wherein the additional lens is in front of the multiplexer/demultiplexer, a distance between the additional lens and the multiplexer/demultiplexer is equal to a focal length of the additional lens, a distance between the optical convertor and the multiplexer/demultiplexer is equal to a focal length of the optical convertor, and a distance between the optical convertor and the light beam modulator is equal to the focal length of the optical convertor.

* * * * *